Sept. 2, 1958 H. HARTMANN ET AL 2,850,367
MACHINE FOR THE AUTOMATIC CUTTING AND
SETTING OF WHITE PEAT SODS
Filed June 4, 1956 6 Sheets-Sheet 2

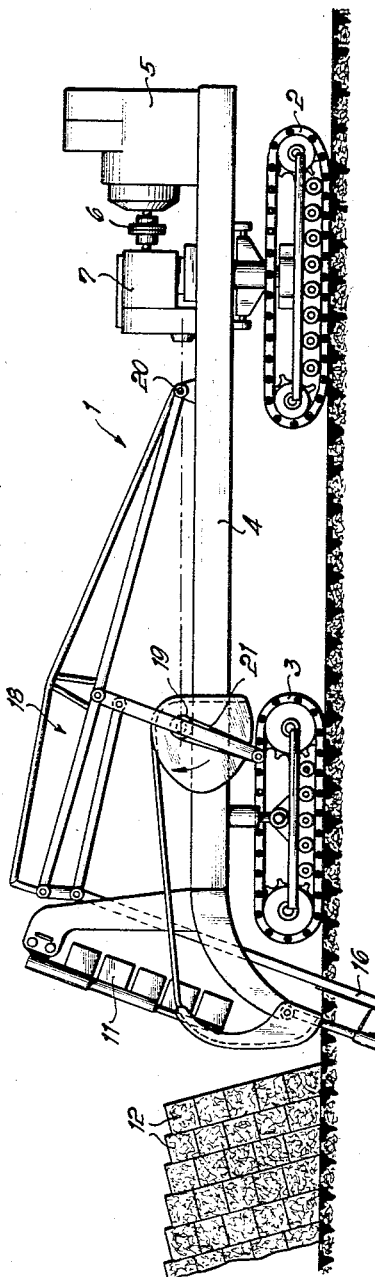
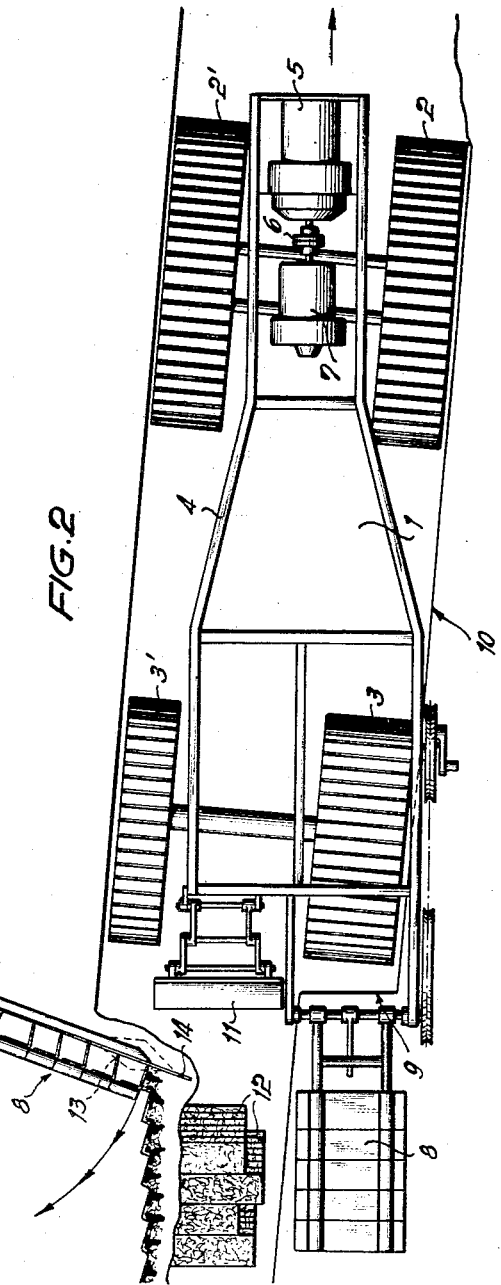

INVENTORS
Heinrich Hartmann
Heinrich Horstkamp
by Malcolm W. Fraser
attorney

Sept. 2, 1958

H. HARTMANN ET AL 2,850,367

MACHINE FOR THE AUTOMATIC CUTTING AND
SETTING OF WHITE PEAT SODS

Filed June 4, 1956

INVENTORS
Heinrich Hartmann
Heinrich Horstkamp
by Theodore W. Fraser
attorney

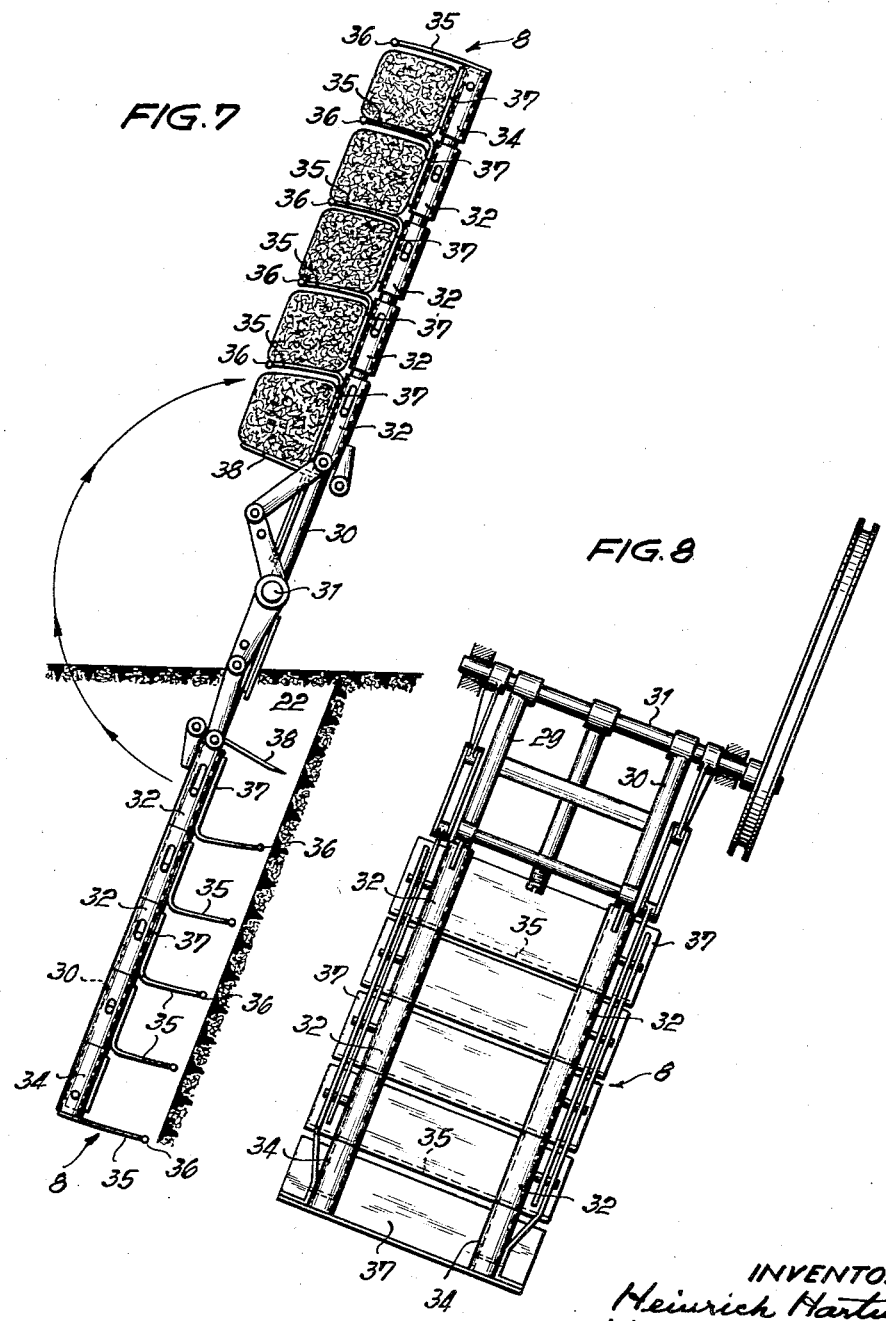

United States Patent Office 2,850,367
Patented Sept. 2, 1958

2,850,367

MACHINE FOR THE AUTOMATIC CUTTING AND SETTING OF WHITE PEAT SODS

Heinrich Hartmann, Gross-Hesepe, near Meppen, and Heinrich Horstkamp, Meppen, Germany Application June 4, 1956, Serial No. 589,093

Claims priority, application Germany November 7, 1955

11 Claims. (Cl. 44—29)

The invention relates to a method for the fully automatic cutting and setting of white peat sods.

It is known to cut individual sods from the grown plot by the aid of impact frames. These sods are then set by hand or by means of a conveyor, and are subject to further treatment.

The invention has the object of making this process of operation fully automatic, and of considerably speeding up and thereby facilitating the entire recovering of the grown layer of peat.

This object is attained by a method which can be made fully automatic with the greatest possible saving in space and with obviating as far as possible the manual work involved by the cutting and setting of the white peat sods in that a layer having a depth amounting to one or more thicknesses of sods is cut from the deposit while being subdivided into individual sods, and that the sods of the severed layer of peat are lifted while remaining in their position relative to one another, and are deposited laterally of the recovering tool, in an ordered arrangement.

Preferably the layers of peat subdivided into sods are consecutively set in a position slightly inclined to the vertical, the inclination of the direction of cutting to the vertical being larger than the inclination of the layers of peat set side by side in order to take up the thickness of the sods when being set.

The recovering machinery operates preferably continuously in the direction of recovering, namely at such a rate that the path covered during one working stroke of the recovering tools corresponds to one or more widths of a sod.

The recovering machinery is made to run preferably on the grown soil, and removes at the same time the recovered layer sod-by-sod immediately prior to the lifting of the cut layer of peat.

A machine particularly suitable for carrying out the method according to the invention comprises substantially a cutting device mounted on a vehicle chassis and working approximately from top to bottom, and an impact frame pivotally mounted about a horizontal axis and controlled in unison with the cutting device, from which frame the detached sods are set while maintaining their mutual order.

The rocking amplitude of the impact frame extends preferably 180°, and devices for removing the sods from the tilted-up impact frame are provided, for example with a sod pusher, which pushes the sods out of the impact frame for the purpose of setting. The sods are preferably not set directly from the impact frame, but over a setting device, which in its starting position is flush with the impact frame in the discharge position of the latter, and which takes over the sods pushed out by means of the pusher, and sets the same while maintaining their mutual disposition.

Further details, features, and the advantageous formation of the various elements of a machinery particularly suitable for carrying out the method according to the invention will become clear from the following description with reference to the accompanying drawings in which:

Figure 1 is a sde elevation of the partly worked bay of the field with the machinery advancing on the grown soil;

Figure 2 is a plan view to Figure 1;

Figure 7 is a side elevation of the impact frame, the lower position representing the impact position, and the upper position representing the tilted-up position prior to the delivery to the setting device;

Figure 8 is a plan view of the lower portion of Figure 7 as viewed in the direction of the arrow VII;

Figure 3:
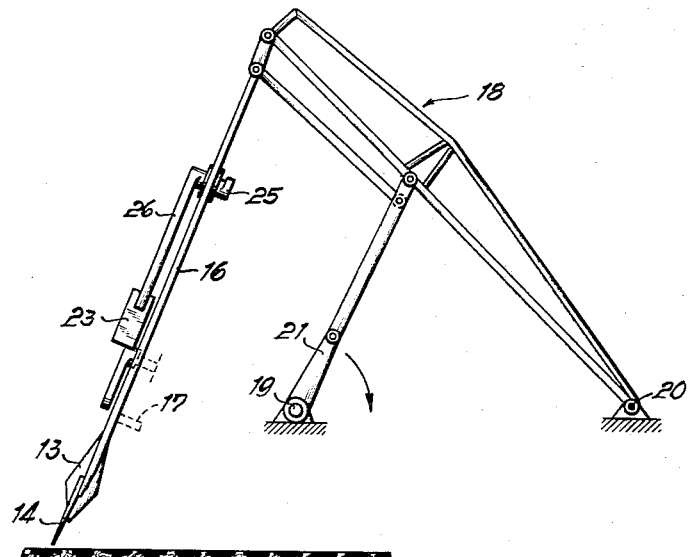
Figure 3 is a side elevation of the cutting device.

From the illustration of Figures 1 and 2 the general construction of a machinery for carrying out the method according to the invention will be clear.

The machinery 1 moves on caterpillar tracks 2, 2' and 3, 3' continuously along the edge of the ditch. On the chassis 4 of the machinery the shaft of the caterpillar drive mechanism 2, 2', the driving engine 5 with the clutch 6 and the gearing 7 are mounted. The rear caterpillars 3, 3' are idle tracks, above which merely the mechanisms required for carrying out the working operation as well as the associated components of the driving mechanism are mounted. The chassis 4 is pivotally mounted on the driven front caterpillar tracks, whereas the idle rear tracks are fixedly mounted on the chassis. The chassis is merely adjustable in height relative to the rear caterpillar tracks and relative to the ground. Thereby unevenness of the fields, if any, may be compensated for, and the chassis remains practically always horizontal with respect to the field. This arrangement of the drive is of great importance particularly for the recovery of white peat, since the areas of the ground provided for the recovery of white peat are more or less saturated with water, and the machinery applied to them can be operated with a very low pressure on the soil.

As will be seen from Figure 2, the chassis is slightly slanted relative to the direction of travel. This serves for leaving sufficient play to the impact frame 8 with respect to the dug-out-field edge 9 in order that the cutting process may be carried out faultlessly without any hampering contact with the edge of the ditch, in a free fall.

The machinery illustrated in Figures 1 and 2 moves continuously along the edge 10 of the ditch, and thereby cuts up the moor behind itself at a predetermined depth into sods of uniform thickness while simultaneously removing the rubbish forming the uppermost layer of the field. Subsequently the sods are reversed in their stratification by tilting up the impact frame 8 through an angle of 180°, and are pushed transversely of the direction of driving by means of the sod pusher into a setting device 11, which deposits the same on to the bay of the field not yet worked upon in the vicinity of the freshly worked edge of the ditch. The sods may be offset in the longitudinal direction if desired, i. e. in an arrangement favouring the drying, while the machinery according to the invention repeats the same working operation when moving further on. The mutual offset of the sods will be seen at 12 in Figure 2.

Figure 4:
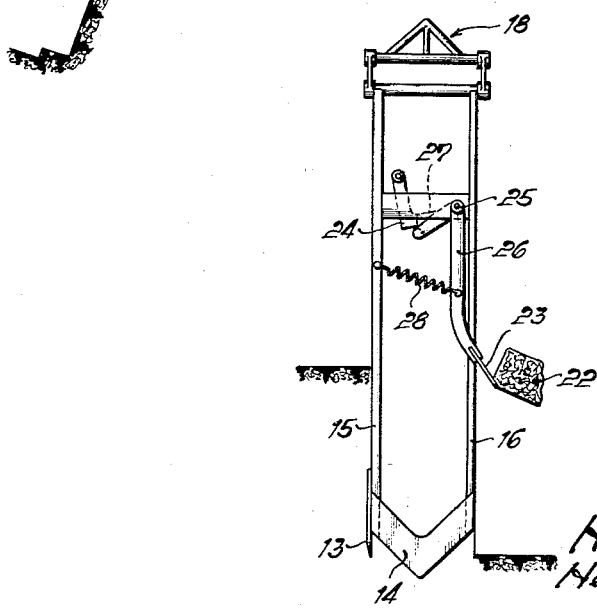
Figure 4 is a front elevation of the cutting device.
Figure 5:
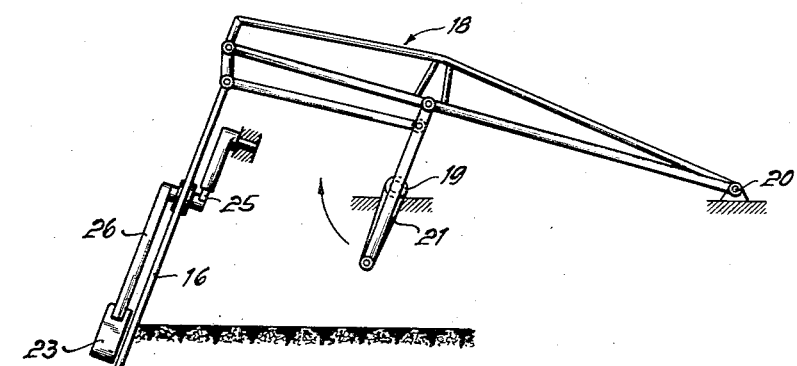
Figure 5 is a lateral elevation of the cutting device in the cutting position.

In the Figures 3 to 6 the cutting device is illustrated. The cutting device comprises two knives 13, 14 standing at right angles to one another which are fixed on two push rods 15, 16 which at the beginning of the cutting operation bear on an abutment 17 fixed to the chassis of the machinery. On top they are guided by a system of levers 18, which is articulated at 19 and 20 to the chassis of the machinery. At the forward movement of the machine they are brought by means of the system of levers into the position illustrated in Figure 3, and then cut into the peat surface in the direction shown in Figure 5, severing off a layer of the thickness of a sod from the peat. The incision may be effected at a distance from the free surface of the peat corresponding to the thickness of one or more sods. The Figures 3 and 5 show moreover a link 21 which is moved in the direction of the arrow when advancing the machine, and thereby effects the incision by the cutting device. After the penetration of the cutting knives into the peat the machine carries along the abutment 17 when uniformly moving forward, while the push rods 15, 16 force the knives further into the peat layer, independently of the abutment, in the cutting direction determined by the system of levers 18. After the completion of the incision the impact frame 8 penetrates into the layer of peat severed off by the knives, as will be described in more detail later, and thereby severs the rubbish layer lying on top of the layer of peat (conf. Figure 7 at 22).

Figure 6:
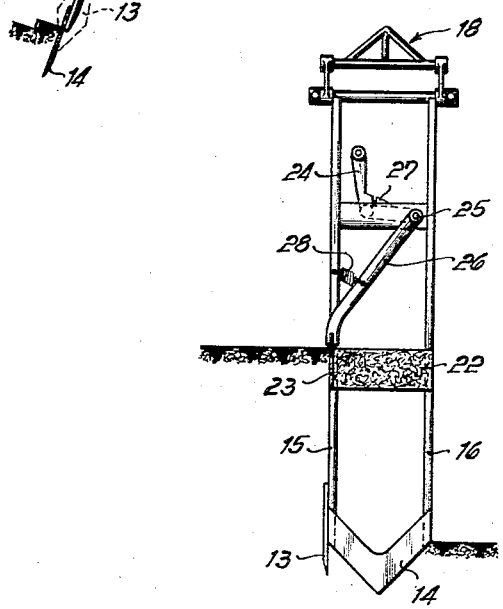
Figure 6 is a front elevation of the cutting device in the position according to Figure 5.

In the embodiment illustrated a clearing shovel 23 is connected to the cutting device which follows the cut of the knife along the edge of the ditch, and upon pulling up the cutting device by means of a pawl 24 (conf. Figure 6) has a rocking moving imparted upon its pivot point 25 mounted on the cutting device, whereby the lever arm 26 carrying the same is forced outwardly in the direction towards the open side of the ditch and the clearing shovel moves the rubbish into the open ditch. After the termination of this operation the clearing shovel frees itself (as seen in Figure 4) from the pawl 24 by means of the nose 27 and returns to its initial position under the pull of the spring 28.

From Figure 4 the rubbish 22 is moved by the shovel 23 into the open ditch.

Of course any other construction of a clearing device may be used, e. g. a gripper coupled to a cutter which gripper lifts the rubbish when withdrawing the cutter, and deposits the same on a conveyor or the like.

Figures 7 and 8 show the impact frame 8 in its two most important working positions. The impact frame 8 has two tubular stems 29, 30 which are pivotally mounted on a transverse shaft 31. On the stems at any time an equal number of pipe-sections 32 is shiftable, and one pipe section 34 is fixedly mounted thereon. Each pair of pipe sections carries a cutter knife 35 which is curved at a radius of curvature corresponding to its distance from the rotatable shaft 31, and has a reinforced cutting edge 36 and a back plate 37 contacting the pipe section. The cutter knives together with the back plate form a box open at the front sides and at one longitudinal side, into which the sods are knocked after the dropping of the impact frame.

By the construction of these boxes it is made possible to turn the impact frame 180° in the direction of the arrow, without the rods dropping out. Moreover the back plates control the depth of penetration of the impact frame and buffer the impact frame softly owing to the air trapped between them and the layer of peat to be removed.

The reinforced cutting edges 36 of the cutting knives 35 prevent any excessive friction of the peat on the knife faces during the penetration of the knife into the peat layer, and favour the retention of the sod when tilting up the impact frame. The clearing knife 38 which is mounted pivotally on the first pair of pipe sections 32, is inserted in contradistinction from the other cutter knives 35, into the surface of the peat in such a manner that the sod, which is the uppermost when being cut and the lowermost when deposited, receives the correct setting face for the depositing. When tilting the impact frame up, the pipe sections mounted on the stems 29 are shifted with respect to one another in such a manner that the knives attached on them are spaced from one another in the uppermost position of the frame.

This operation takes place when the impact frame has been rocked beyond the upper dead centre position, in order to prevent thereby the dropping out of the sods. The frame then bears on an abutment, and the sods now resting loosely between the knives are brought from their frontal side into a setting frame in the direction towards the setting place by the aid of a sod pusher. After the sods have arrived there, the sod pusher returns to its starting position, the impact frame having in the meantime performed its next impact on to the peat.

Figure 9:
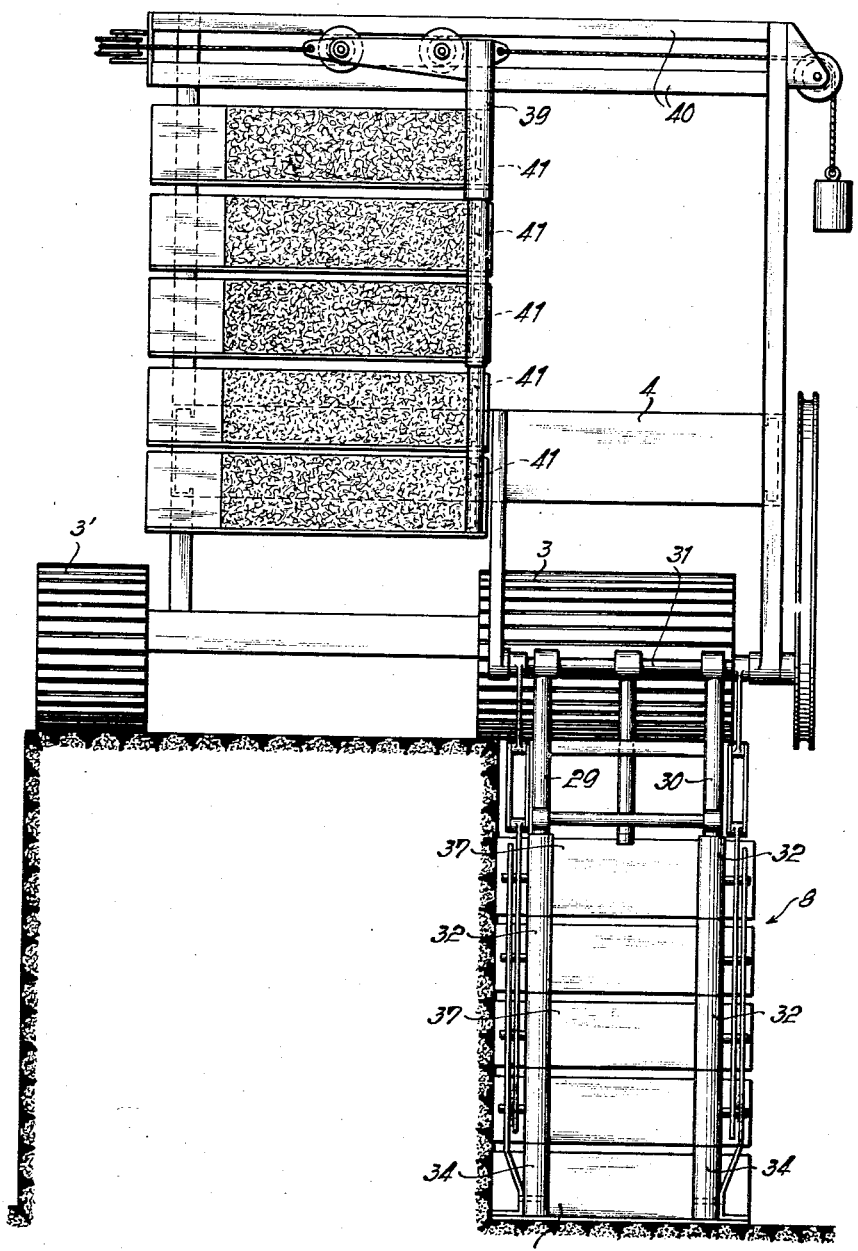
Figure 9 is a front elevation of the machine according to the invention.

The sod pusher is illustrated in Figure 9. The sod pusher comprises a rod 39 which is slidable in a horizontal guide 40 and fitted with plates 41. These plates can slide between the cutting knives of the impact frame, and thus push the sods out of the impact frame into the depositing device arranged by its side. Since the depositing device is wider than the length of the sods, the sods can be alternately pushed more or less deeply into the depositing device, so that when setting the sod an arrangement favourable to air drying is attained which has the further advantage that the piles stand more firmly.

Figure 10:
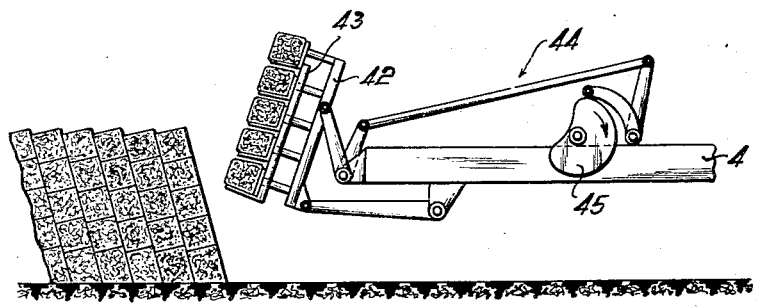
Figure 10 is a side elevation of the setting device shortly after taking in the sods from the impact frame.
Figure 11:
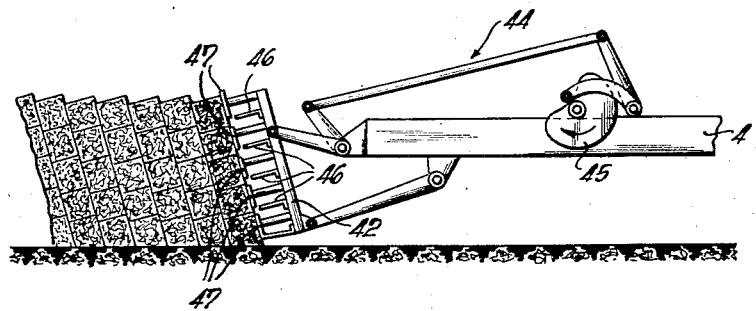
Figure 11 is a side elevation of the setting device after the depositing of the sods.

The depositing device is illustrated in the Figures 10 and 11, and consists of two frames 42, 43 which are movable one with respect to the other, and which are driven relative to one another by a linkage 44 and a crankdrive 45. The frame 43 carries horizontal plates 46 at the spacing of the opened impact knives. The frame 42 has vertical plates 47 similar to the back plates of the impact knives. The depositing device stands in its rest position in alignment with the tilted up impact frame, so that the sods pushed out of the impact frame by the sod pusher slide directly into the depositing device. When the depositing device is filled, the same is lowered by means of the linkage 44 and of a cam disk 45, and leans at the same time back. At the same time the frame 42 is pulled back into the frame 43. Thereby the horizontal plates 46 disappear behind the vertical plates 47, and the sods are deposited at the edge of the ditch. The sods are set at a steeper angle than that at which they had been dug, in order that the dug-up peat may safely find a place in the pile.

We claim:

1. A machine for cutting and depositing white peat sods, comprising a base, a cutting tool on said base and adapted to be forced into peat of a grown moor to separate a layer therefrom, an impact frame on said base and having several knives adapted to divide said layer into a plurality of individual sods upon impact of said frame and penetration of said knives into the face of said layer, said frame being rotatably mounted on said base, means to turn said frame about 180° from its position of engagement with the peat layer to a raised position in which said frame is adapted to hold the separated layer cut by said knives into individual sods forming a stack, a receiving and depositing member for said stack on said stack on said base, means on said base to move said member to the side of said frame in alignment therewith, transferring means on said member and being adapted to slide said sods from said frame to said member, said moving means for said member being also adapted to move said member to the field level and tilt it in opposite direction from its receiving and transferring position when said sod stack is to be deposited on said field and placed against a previously deposited sod stack.

2. A machine according to claim 1, wherein said knives are mounted on said frame to be displaceable parallel with respect to one another, and wherein a control mechanism is provided on said frame, said control mechanism being operatively connected with said knives to increase their mutual distance when said frame is turned to its raised position.

3. A machine according to claim 1, wherein said knives have cutting edges of a thickness larger than that of the blades of said knives.

4. A machine according to claim 1, wherein the knife closest to the field level is hingedly mounted on said frame in such a manner, that it remains at least approximately tangentially with respect to the turning circle of said frame and is movable in such a manner, that the penetrating direction of said knife in said peat layer is retained.

5. A machine according to claim 1, wherein said receiving and depositing member is equipped with a number of individual supporting plates for said sods corresponding to the number of said sods, and wherein a rear plate of said member is displaceably mounted thereon and operatively connected to said moving means for slipping off said sods as stack from said member when depositing said stack on said field.

6. A machine according to claim 1, wherein said base is mounted on a vehicle adapted to be advanced along the edge of a ditch presenting the face of said peat layer substantially transverse to the direction of movement of said vehicle.

7. A machine according to claim 1, wherein the angle of attack with respect to the vertical of said cutting tool on said peat is larger than the angle to which said moving means tilts said receiving and depositing member when depositing said sod stack on said field.

8. A machine according to claim 1, wherein said receiving and depositing member is wider than said knives so that said sods can be stacked therein while being staggered laterally with respect to one another, and wherein said sliding means for said sods are adapted to extend alternately with different depths into said member to obtain said laterally staggered positions of said sods.

9. A machine according to claim 6, wherein said vehicle comprises two track-laying trucks supporting said base, said trucks being disposed one behind the other in the direction of advance of said vehicle, and wherein the front track is pivotally connected to said base and is provided with a drive engine, clutch and gear operatively connected to the tracks of said front truck.

10. A machine according to claim 6, wherein the axis of rotation of said frame on said base forms such angle with respect to the longitudinal center axis of said vehicle that said frame is slightly inclined with respect to said direction.

11. A machine according to claim 9, wherein the tracks on the rear truck are free-wheeling, and wherein said rear track is tiltable in a vertical longitudinal plane with respect to said base, to which it is otherwise secured against turning.

References Cited in the file of this patent

UNITED STATES PATENTS

| 1,373,627 | Moore | Apr. 5, 1921 |
| 1,954,933 | Hauerkort | Apr. 17, 1933 |
| 2,200,137 | Steinert | May 7, 1940 |

FOREIGN PATENTS

| 670,492 | Great Britain | Apr. 23, 1952 |